June 4, 1963
K. L. BERNINGER
3,092,090
SPEED MAINTAINING MECHANISM
Filed Dec. 31, 1958
3 Sheets-Sheet 1
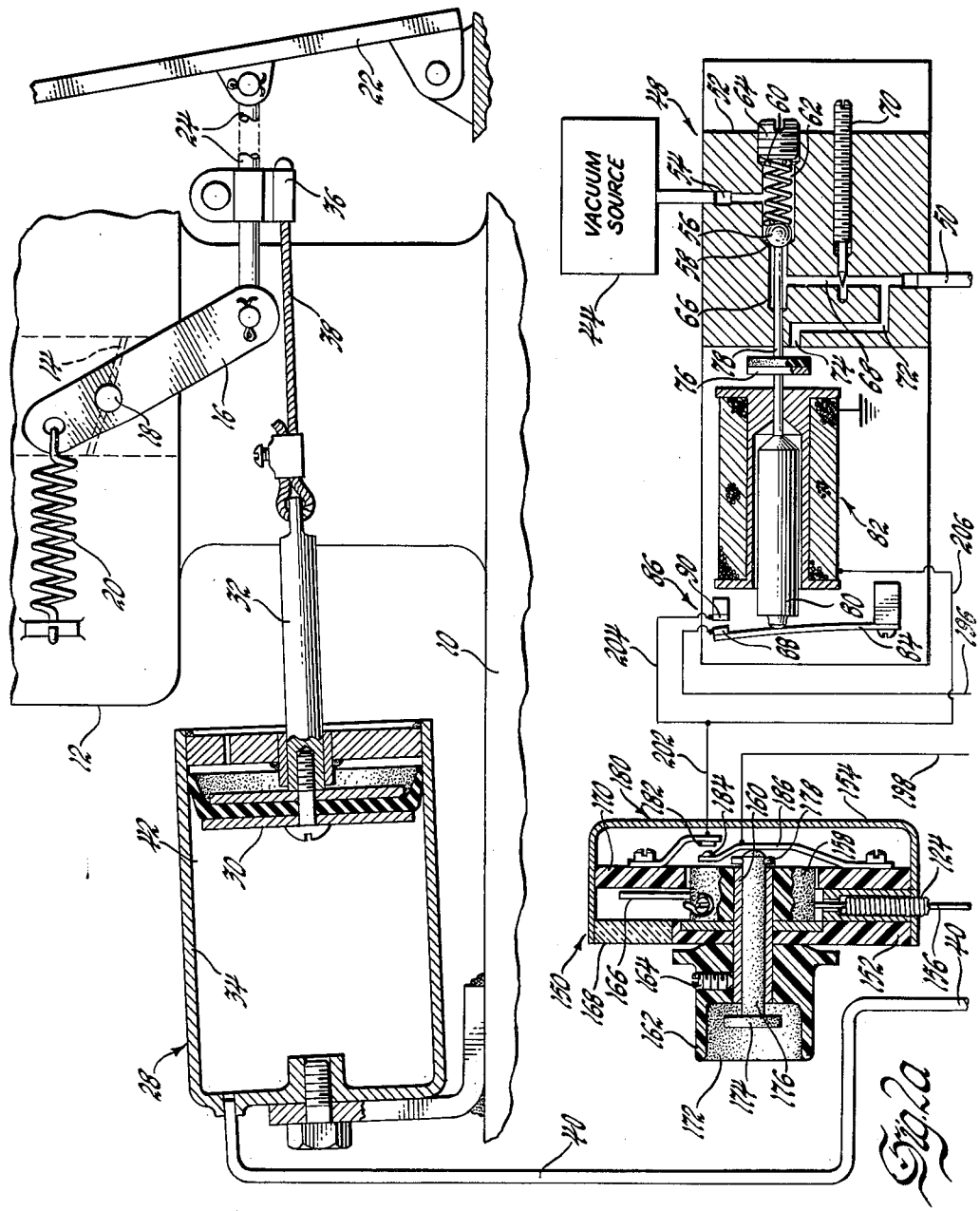
INVENTOR.
Kenneth L. Berninger
BY
ATTORNEY

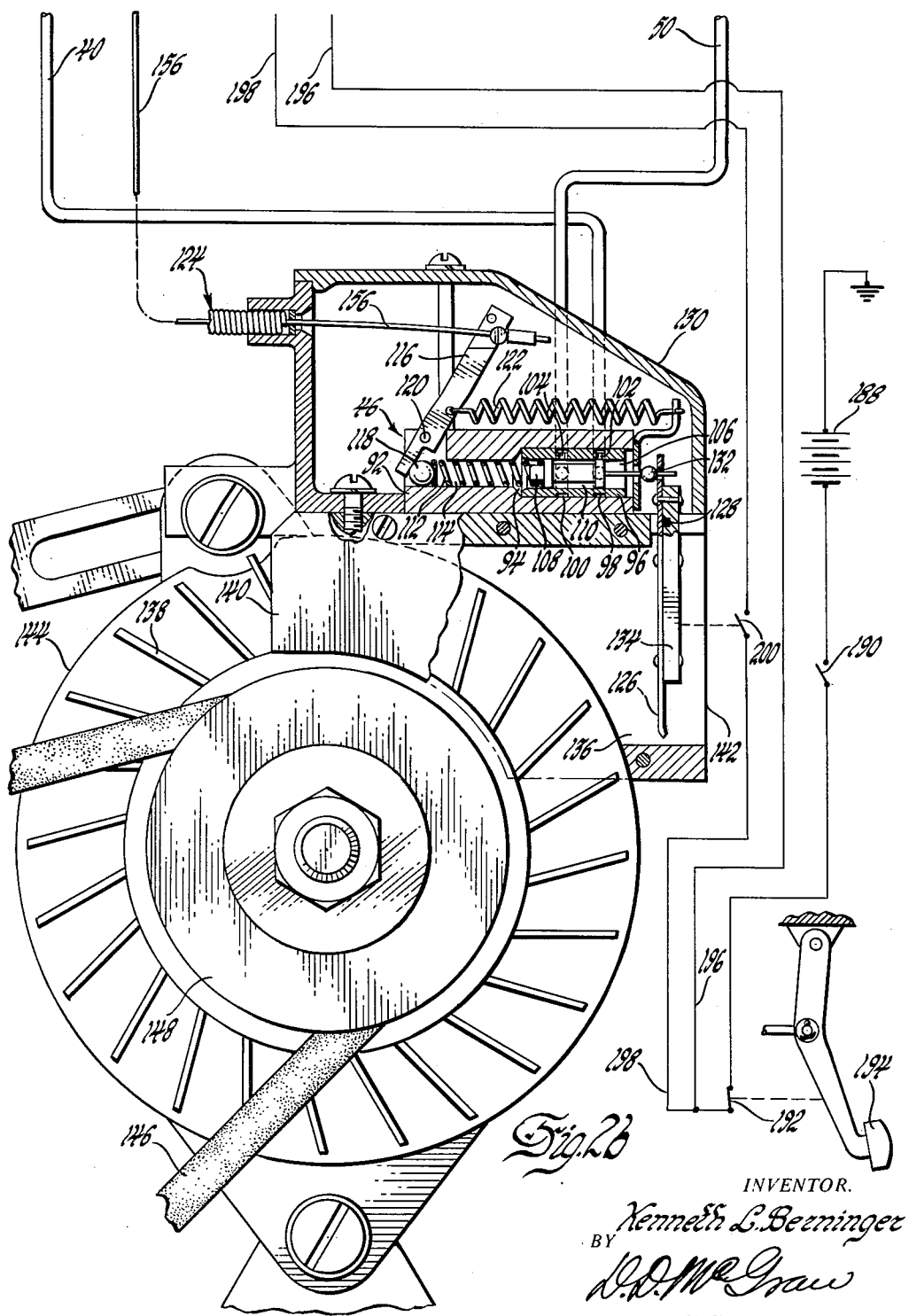

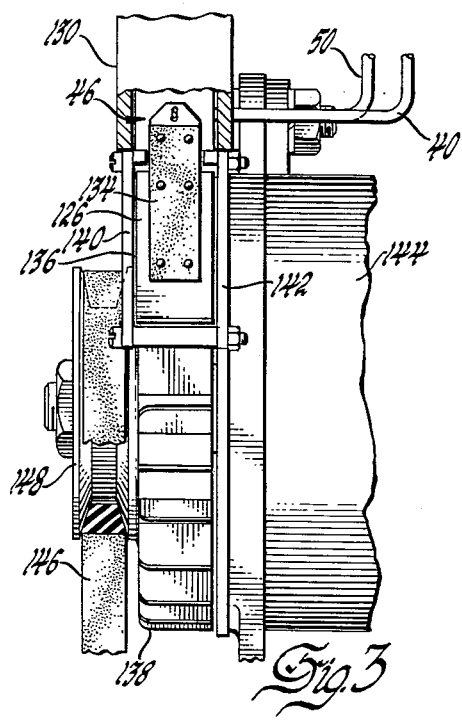
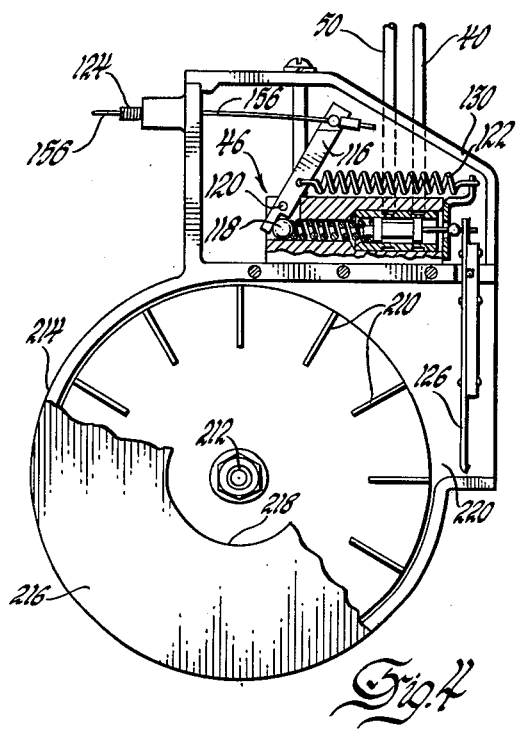
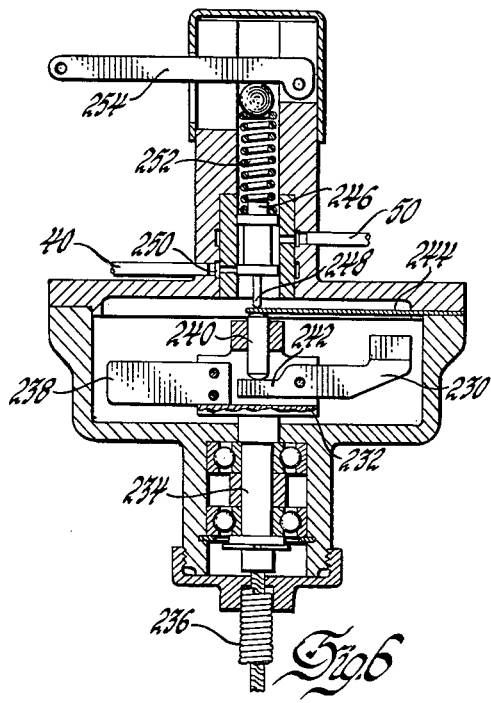
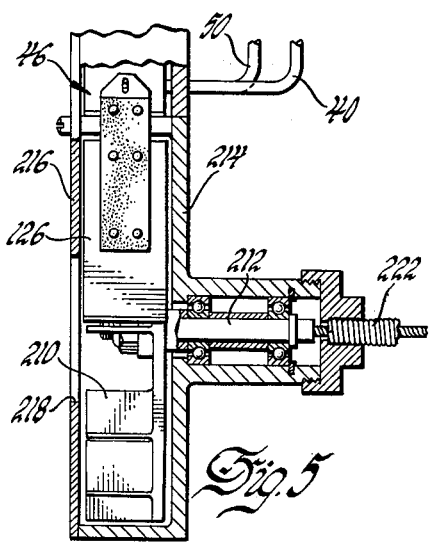

United States Patent Office 3,092,090
Patented June 4, 1963

3,092,090
SPEED MAINTAINING MECHANISM
Kenneth L. Berninger, Dayton, Ohio, assignor to General Motors Corporation, Detroit, Mich., a corporation of Delaware
Filed Dec. 31, 1958, Ser. No. 784,270
4 Claims. (Cl. 123—103)

The invention relates to a speed maintaining system for an engine which is preferably used to drive an automotive vehicle. The preferred embodiment of the invention is illustrated and described as being installed in an automotive vehicle although other installations may benefit from use of the system. The invention more particularly relates to a speed controlling system which senses a parameter which is indicative of the speed of the vehicle or engine to control the engine power controlling mechanism so that a constant predetermined vehicle speed or engine speed may be maintained without regard to changes in load requirements on the engine.

There have been many proposals in the past to provide mechanism for controlling and maintaining the speed of an automotive vehicle without requiring the vehicle operator to keep his foot on the accelerator pedal at all times. Most of the systems have been relatively complicated and complex in structure, resulting in high initial cost and high maintenance costs as well as unsatisfactory operation due to the complexity and sensitivity of the system. The invention herein described and claimed provides a simple and accurate mechanism which will control the vehicle speed through a normal vehicle speed cruising range at any speed determined by the operator. The system is provided with safety features which will de-activate the controlling mechanism at any time desired by the operator and may be automatically de-activated by actuation of the vehicle brake pedal. If the system should malfunction in any manner, the mechanism will not accelerate the vehicle beyond the preset speed, but will remove itself from influence of the vehicle speed controlling linkage.

The preferred structure embodying the invention senses the vehicle or engine speed by a unique governor arrangement which is actuated by a rotating portion of the vehicle driving means. The typical vehicle driving means includes the vehicle engine, transmission, drive shaft, differential, drive axles and wheels. The governor controls the application of power to a servomotor which will in turn control the vehicle engine speed control mechanism. The system embodying the invention is provided with a lockout control which will prevent the system from becoming engaged without the conscious knowledge of the operator. The system may use any suitable source of power and is illustrated as using a vacuum power source such as the intake manifold of the engine being controlled. It is believed to be obvious that the system may use a positive pressure power source if desired.

In the drawings:

FIGURE 1 illustrates the cooperative relation of the separate portions of FIGURE 2.

FIGURE 2 is formed of FIGURES 2a and 2b and shows the mechanism embodying the invention as a partial schematic representation with various elements having parts broken away and in section.

FIGURE 3 is a side elevation view of a portion of the mechanism of FIGURE 2b with parts broken away and in section.

FIGURE 4 is a front elevation of a modification of the mechanism of FIGURE 3 with parts broken away and in section.

FIGURE 5 is a side view of the mechanism of FIGURE 4 with parts broken away and in section.

FIGURE 6 illustrates another modification of FIGURE 3 with parts broken away and in section.

An automotive vehicle in which the embodiments shown in the drawings may be used is powered by an internal combustion engine 10. If the engine is of the spark ignition type, the supply of fuel and air to the engine is usually controlled by the carburetor 12. Although the invention may be used on compression ignition or fuel injection engines, a carbureted engine is illustrated for convenience. The carburetor may be of any known construction and typically includes a throttle valve 14 in the carburetor air intake. The valve 14 is pivoted by link 16 acting on the throttle valve shaft 18. A throttle closing spring 20 may be attached to link 16 and act under tension to urge the throttle valve 14 to the closed position. The automotive vehicle is provided with the usual throttle control linkage including the accelerator pedal 22 and the link 24. This link is so arranged that depression of the accelerator pedal by the foot of the vehicle operator causes the throttle valve to open, and release of the accelerator pedal permits the throttle closing spring 20 to close the throttle.

Power servo 28 may be mounted in any suitable position so as to connect the servo with the throttle linkage. The servo 28 is illustrated schematically as including a piston 30 mounted for reciprocation with the piston shaft 32 and within the cylinder 34. It is to be understood that other types of power servos such as a diaphragm or bellows type servo may be used. While the servo is illustrated in the drawings as being vacuum operated, the servo may also be designed for positive pressure operation. The piston shaft 32 is connected to throttle link 24, for example, by means of a bracket 36 and any suitable flexible connection 38. Connection 38 is preferably of a type which will transmit power in one direction but will be free to move in the other direction without transmitting any force. This connection will permit movement of the accelerator pedal 22 and its associated linkage toward the open throttle position without the necessity of overcoming the servo 28. The servo, on the other hand, will not affect the position of the throttle valve 14 when the accelerator pedal is so operated.

A servo supply line 40 is connected with the servo chamber 42 at one end and is operatively connected with a source of power 44 through a control valve assembly 46 and a power application control assembly 48. The portion of line 40 intermediate assemblies 46 and 48 is identified as line 50. The source of power 44 may be any suitable source and is described hereafter as a vacuum source such as the engine intake manifold. It may also be a separate vacuum source or, with appropriate rearrangement of the servo and control mechanisms, it may be a positive pressure source such as the air pressure reservoir now used with air suspension or brake systems. The system may also be used as a hydraulic system in which case the power source 44 would be a suitable oil pump or oil pressure reservoir. In any case, it is only necessary that the source 44 supply power to the servo mechanism 28. The control of the application of power to the servo is not dependent upon the characteristics of the source of power used.

The power application control assembly 48 includes the schematically illustrated valve block 52 having exhaust 54 leading from check valve 56 and to source 44. Valve 56 seats against seat 58 and is urged against that seat by compression spring 60. Spring 60 and valve 56 are retained in the check valve chamber 62 by any suitable means such as plug 64. The chamber 66 opposite valve 56 is connected with a passage 68 in which a needle-type regulator valve 70 may be positioned. Valve 70 may be adjusted to properly balance the system. A passage 72 connecting with atmospheric port 74 is connected with passage 68 and, under certain operating conditions, connects the servo chamber 42 to atmosphere. The atmospheric port valve 76 is positioned for movement to open or close the port 74, as desired. Valve 76 may be mounted on a shaft 78 which has one end extending through chamber 66 and into contact with check valve 56 and the other end extending outwardly and being enlarged to provide a solenoid plunger 80. Plunger 80 forms the core of solenoid 82. Shaft 78 and plunger 80 are urged to the left as illustrated in FIGURE 2a by check valve spring 60. The other end of plunger 80 is illustrated as contacting the cantilever spring 84 which is a part of the solenoid hold switch 86. One of the switch points 88 is mounted on the spring 84 and the other point 90 is positioned so that the points are disengaged when the solenoid is de-energized, as illustrated, and are closed when the solenoid is energized, moving plunger 80 to the right. Energization of the solenoid 82 also moves valve 76 to close port 74. The valve may also act as a solenoid stop if desired. When plunger 80 is moved to the right, rod 78 acts against check valve 56 to open the valve and permit the flow of fluid past valve seat 58 and between chambers 62 and 66.

The control valve assembly 46 includes the valve block 92 in which a chamber 94 is formed. Valve port sleeve 96 is received within chamber 94. Port 98 extends circumferentially about sleeve 96 and is connected with the portion of servo supply line 40 connecting assembly 46 with the servo 28. Port 100 is similar to and spaced from port 98 and is connected with line 50. Ports 98 and 100 are each provided with a radially extending passage, 102 and 104, respectively. These passages connect the ports with the inner chamber 106 of sleeve 96.

A spool valve 108 is slidably received within chamber 106 and is provided with spaced lands which are spaced further apart than are passages 102 and 104 of sleeve 96 so that they form an annular connecting chamber 110 from a portion of chamber 106. Depending upon the position of valve 108, lines 40 and 50 may be interconnected through chamber 110 to permit power to be delivered to servo 28 from source 44; the flow of power through chamber 110 may be metered by a balancing action of valve 108 to be described; or one of the valve lands may completely close off one of the passages to fully interrupt the flow of power to the servo 28. The latter condition is shown in FIGURE 2b. A compression spring 112 may be received within a reduced end 114 of chamber 106 and act against valve 108, urging the valve toward the right as illustrated in the drawing. The force exerted by spring 114 may be adjusted by lever 116 acting through ball 118. Lever 116 is pivotally mounted at 120. Since spring 112 may be of relatively small absolute force, a tension spring 122 may also be provided to act on lever 116 so as to relieve some of the force on spring 112 and hence to lessen the force exerted by that spring against valve 108. Lever 116 is connected with control cable 124 so that it may be manually operated by the vehicle operator to set the force of spring 112 at a predetermined value. This value will determine the speed to be maintained by the system.

Valve 108 is also connected to some suitable means sensing the actual speed of the vehicle engine or the speed of the vehicle itself. In the particular structure illustrated in FIGURE 2b, this sensing mechanism takes the form of a weighted air vane 126 which is pivoted at 128 to a portion of housing 130. Control valve assembly 46 is mounted within housing 130. The connection 132 between vane 126 and valve 108 is such that the vane, when pivoting counterclockwise as seen in the drawing, will urge valve 108 against spring 112. Vane 126 is provided with a weight 134 which will tend to hold the vane in a substantially vertical position when no forces are acting thereon.

One modification of the mechanism for sensing the speed of the engine 10 is illustrated in FIGURE 2b.

Housing 130 includes an air passage 136 leading tangentially from the automotive vehicle generator fan 138. This fan is the standard fan normally found on generators and therefore eliminates the necessity for additional parts to be manufactured when this modification is utilized. Air passage 136 is shrouded by side baffles 140 and 142 to prevent ambient air current conditions from affecting the air currents generated within passage 136 by fan 138. Fan 138 in its usual installation is mounted on one end of generator 144 and is driven by the generator drive belt 146 through pulley 148. As the fan 138 is rotated in the clockwise direction, air is blown tangentially from the fan through passage 136. The air in this passage impinges upon air vane 126 and tends to pivot that vane counterclockwise about its pivot 128. The velocity head of the air passing through passage 136 bears a direct relation to the speed of the engine 10. The movement of vane 126 by the air flow therefore reflects the speed of the engine. When the automotive vehicle is travelling at speeds above 25 or 30 miles per hour, the speed of the engine is closely comparable to the road speed of the vehicle. This is especially true of vehicles having gear box or standard transmissions since the engine is directly geared to the vehicle drive wheels. It is also true of vehicles having fluid coupling or torque converter transmissions since, at these speeds, the speed ratio of the fluid coupling or torque converter is maintained at a substantially constant value approaching a 1:1 ratio. Vane 126 therefore acts upon valve 108 and moves that valve in accordance with engine or vehicle road speed. The valve in turn controls the application of power to servo 28.

The operator's control unit 150 is provided at a point within the automotive vehicle which is convenient for operation by the vehicle operator. This unit operates the control cable 124 which moves lever 116 to set the assembly 46 to the desired speed to be maintained. Unit 150 includes a base 152 and a cover 154. Cable 124 has one end of the outside armor mounted in base 152. The internal wire 156 extends around a pulley 158 and is secured to the pulley by any suitable means so that, as the pulley rotates, wire 156 is moved within the cable armor. Pulley 158 is secured to hollow shaft 160 on the end of the shaft extending inside cover 154. The shaft extends through base 152 and is rotatable by the external knob 162. This knob is secured to shaft 160 by set screw 164. Pulley 158 may have an indicating arm 166 extending upwardly and behind the transparent window 168 formed in the base 152. Markings may be provided on the window or on the portion 170 of the base behind arm 166 to indicate the speed setting of the unit in miles per hour or other convenient units.

Knob 162 may have an axially extending recess 172 at its outer end which provides a protective cavity in which the reset button 174 is received. Button 174 has a shaft 176 extending through and beyond shaft 160 and into the interior of cover 154. A pin 178 may be provided in the end of shaft 176 opposite button 174 to prevent the button and shaft from falling out through cavity 172. A manual reset switch 180 for solenoid 82 is provided within cover 154 and mounted on base 152 so that it may be closed by pressing reset button 174 inwardly. The switch includes a fixed contact 182 which is mounted to base portion 170 and a spring biased contact 184 which is mounted to the lower portion of base 152 so that its cantilever spring 186 is in contact with the end of shaft 176. Spring 186 is so biased that it normally pushes reset button 174 outward as illustrated and holds points 182 and 184 apart. When the reset button is pushed inwardly, switch 180 is closed and solenoid 82 may be energized to energize the control system.

The switch 180 is located in a portion of the control circuit which will now be described. The engine or vehicle with which the system is installed normally includes a battery or other source of electrical energy 188. Battery 188 is connected through the ignition switch 190 to one terminal of a normally closed switch 192. This switch is operated by the vehicle brake pedal 194 to open whenever the vehicle brake is actuated. The switch may, of course, be actuated by an increase in hydraulic pressure in the brake pedal or in any other suitable manner. The other terminal of switch 192 has wires 196 and 198 leading therefrom. Wire 196 is connected to contact 88 of the solenoid holding switch 86. Wire 198 is connected to contact 184 of switch 180. A normally open switch 200 may be provided in wire 198 if desired. This switch would be so connected as to be closed upon sufficient movement of air vane 126. It may, for example, be so positioned that it will be closed when the air flow in air passage 136 indicates a vehicle speed of approximately 25 or 30 miles per hour. If the air flowing in passage 136 is generated by a fan driven in accordance with engine speed, this feature is important in that it will maintain the entire system inoperative to control the engine throttle valve until the engine has reached a speed comparable to a road speed maintainable by the vehicle with the transmission in a substantially 1:1 ratio. The switch would therefore prevent the operator from using the control system with the transmission in the higher gear ratios normally used when starting and during initial acceleration of the vehicle. A wire 202 connected with contact 182 of switch 180 has one branch 204 leading to contact 90 of solenoid holding switch 86 and a second branch 206 leading to one coil end of solenoid 82. The other end of the solenoid coil is connected to ground.

Examination of the circuits reveals that, in order for the solenoid 82 to be energized so that the control system may be used, the ignition switch 190 must be on, brake pedal switch 192 must be closed (brakes off), and the air vane switch 200 must be closed. Manual reset switch 180 must then be closed in order to energize solenoid 82 through wires 198, 202, and 206. Solenoid holding switch 86 will be closed by movement of plunger 80 since spring 84 is biased to close contacts 88 and 90. Switch 86 then maintains solenoid 82 in its energized position through wires 196, 204, and 206.

During normal operation of the system, speed setting knob 172 will be turned by the operator until arm 166 indicates the desired speed at which the vehicle is to be maintained. This action moves lever 116 to exert a force against spring 112 which is proportional to the predetermined and desired speed. Spring 112 biases valve 108 to the right until further movement of the valve is resisted by air vane 126. The air flow through air passage 136 acts against vane 126 and, upon reaching sufficient strength, moves valve 108 to the left. The valve is moved back and forth under influence of spring 112 and vane 126 to permit power to be controllably impressed within servo 28. Since the air flow acting on vane 126 is proportional to engine or vehicle speed, valve 108 is moved in accordance with that speed and servo 28 is controlled in accordance with that speed. When additional power is transmitted to servo 28, piston 30 and shaft 32 move to the left, pulling throttle link 26 toward the open throttle position. As throttle valve 14 opens, more fuel enters engine 10 and the engine has a greater power output. The engine will continue to have an increased power output until it increases its speed to a point slightly greater than the predetermined set speed. This speed increase is reflected by increased air flow in passage 136 which acts on vane 126 and moves valve 108 to the left to meter, or completely close off, the supply of power to the servo. Since servo 28 is now reduced in power, it exerts insufficient force to hold the throttle linkage open against the throttle closing spring 20 at the earlier attained open position. The throttle thus closes slightly until a balance between the servo 28 and the closing spring 20 is reached. The throttle will then remain stationary so long as the speed of fan 138 remains constant.

If there is an increased load demand on engine 10, the fan 138 will slow down slightly, thus decreasing the air flow acting against vane 126. Valve 108 will then move slightly to the right, permitting additional power to be transmitted to servo 28. The servo then acts to open the throttle valve slightly to increase the engine power. All of these balancing and rebalancing actions within the system take place upon such slight changes in engine or vehicle speed that no appreciable or noticeable change in vehicle speed is obtained even though the vehicle is travelling on uneven roads and thereby presenting a continuously variable load demand on the engine in order to maintain the constant vehicle speed.

If the operator desires to disengage the system at any time, he merely pushes the brake pedal 194 a sufficient amount to open switch 192 and deenergize solenoid 82. This may also be accomplished by opening the ignition switch 190. A separate manual switch may be provided within the solenoid holding circuit at any convenient point if it is also desired to have such a switch available to the operator.

The speed setting of the control system may be changed while the system is in operation by turning the speed set knob 172 in order to readjust the force acting against spring 112. The system will immediately compensate for the change and increase or decrease of engine power to achieve the new desired speed. The system may be energized at any time after the air vane switch 200 is closed. When the reset switch 180 is closed by the operator, servo 28 is energized and operates to bring the vehicle up to the preset speed. This may of course be accomplished by the operator first bringing the vehicle up to that speed by use of accelerator pedal 22 if he so desires.

The modification shown in FIGURE 4 discloses a somewhat different fan drive arrangement for generating the air flow acting against the air vane 126. In this instance, a separate fan 210 is driven from a fan shaft 212 which may be an extension of the engine crankshaft or camshaft. Shaft 212 may be driven by an extension connected with other vehicle driving means members such as the transmission output, drive shaft, a drive axle or a vehicle wheel. Fan 210 is shrouded by the fan housing 214 and the annular shroud 216 which is located on one side of the fan. The other side of the fan is also covered by a shroud. An air inlet opening 218 is centrally provided in shroud 216 and the tangential outlet passage 220 is comparable to the air passage 136 illustrated in the FIGURE 2b. The remaining portions of the modification of FIGURE 4 are substantially identical to those portions illustrated in FIGURE 2b and the same reference characters are therefore used.

The auxiliary fan which is utilized in FIGURE 4 may be driven by elements other than rotating parts of the engine, as noted above. The structure illustrated in FIGURE 5 shows that the extension drive for shaft 212 may be a flexible shaft. The fan 210 is mounted in the fan housing 214 and provided with the shroud 216 in the same manner as in FIGURE 4. The fan shaft 212 is driven by a flexible shaft 222. Flexible shaft 222 may receive its drive from the speedometer drive of the vehicle, from any other portion of the vehicle transmission, or, in fact, from any portion of the vehicle drive train. The fan unit may then be positioned in any desired place within the vehicle and is not limited to attachment directly on the generator as illustrated in FIGURE 2b. It has been found, however, that the structure of FIGURES 2a and 2b gives entirely adequate results without requiring the additional parts which must be manufactured for such modification. In some instances, however, the overall considerations of design and space limitations may require use of such a drive, and it will give substantially the same results.

The modification illustrated in FIGURE 6 uses a centrifugal flyweight unit in order to sense the speed of the portion of the vehicle power system to which the flyweights are attached for rotation. The centrifugal flyweight 230 is pivotally attached to the weight carrier 232 so that it may pivot outwardly under influence of centrifugal force as the carrier is driven by the shaft 234. Shaft 234 is illustrated as being driven by flexible drive shaft 236, which may in turn be driven from any suitable portion of the vehicle driving means such as the engine, transmission output, or a wheel. Carrier 232 is also provided with a counterweight 238 and an axially movable pin 240 which engages the inner end 242 of flyweight 230. Pin 240 is urged downwardly by leaf spring 244, thus urging the weighted portion of flyweight 230 pivotally inward toward the axis of rotation of carrier 232. Servo valve 246 has an extension 248 which engages pin 240 through the end of spring 244 so that the valve is reciprocated within the valve chamber 250 in accordance with the pivotal movement of flyweight 230. The speed setting spring 252 acts against one end of valve 246 and is comparable to spring 112 earlier described. The spring 252 may be preset by movement of lever 254. Power supply lines 40 and 50 are controlled in substantially the same manner as they were controlled in the modification of FIGURE 2b.

A control system has been provided which will operate to maintain an automotive vehicle at a constant predetermined speed and will compensate for load requirement differences while maintaining this speed. The system may also be used on a stationary engine subject to variable load conditions to maintain a constant speed. The system is easy to control and provides accurate operation with minimum maintenance costs. The system is especially safe since the servo used to increase the throttle opening must have an increase of power to so act. If at any time any of the supply lines are loosened or the servo develops a leak, the system will merely permit the accelerator pedal to return to the zero throttle position under influence of the throttle closing spring. The system will therefore not operate to open the throttle to the full throttle position as will some systems already on the market. This is a very desirable safety feature since even the best designed and maintained mechanisms may develop operational difficulties.

What is claimed is:

1. Mechanism for controlling the application of fluid pressure to a servomotor from a source of fluid pressure, said mechanism including a line connecting said servomotor and said fluid pressure source, first control means in said line having a port normally open to atmospheric pressure and a check valve preventing loss of fluid pressure from said source when said port is open and valve means for closing said port and holding means for holding said valve means in the closed port position when energized, and second control means in said line responsive to a control parameter of said servomotor for metering fluid pressure to said servometer in accordance with said parameter when said port is closed.

2. The mechanism of claim 1, said holding means comprising a solenoid holding said valve means in the port closed position when energized and opening said valve means when denergized and having a holding circuit which must be manually actuated to energize said solenoid.

3. An engine speed controlling system comprising, a power servo adapted for connection to an engine speed control member and a pilot valve assembly having a movable pilot valve member operating to control fluid pressure delivered to said servo, said pilot valve assembly including speed setting means acting in a direction on said pilot valve member tending to increase engine speed and speed sensing and force supplying means connected to act on said pilot valve member in the opposite direction to said speed setting means, speed responsive means adapted to transmit speed signals to said speed sensing and force supplying means, a source of fluid pressure for said servo, means connecting said source to said servo through said pilot valve assembly, a fluid pressure shutoff valve in said connecting means, an electric circuit and source of energy therefor, and electromagnetic mechanism in said circuit and operative when electrically energized to open said fluid pressure shutoff valve and hold it open, a normally open switch in said circuit connected for operation to the closing position by said speed detecting and force supplying means when said speed detecting and force supplying means is moved to a predetermined position in opposition to the action on said speed setting means in response to signals received from said speed responsive means.

4. A speed maintaining system for a mechanism having driving means including an engine and a transmission and a drive shaft and drive wheels; said system comprising a source of fluid pressure, a power servo operatively connected to an engine control member, a spring biasing said servo in an engine speed reducing direction, a pilot valve servo controlling assembly including a housing and a chamber formed in said housing and a first port in said housing having means connecting said chamber with said servo and a second port in said housing having means connecting said chamber with said fluid pressure source and means connecting said chamber with atmospheric pressure, a pilot valve received in said chamber and having port control means in valving relationship to one of said ports, speed establishing spring means acting on said valve for axial movement thereof in a speed increasing direction, speed sensing means operatively connected with a portion of said mechanism driving means to sense the speed thereof and acting on said valve to move it axially in a speed decreasing direction, an electrical circuit and a source of energy therefor, a signal device and an electrical means in said circuit for actuating said signal device, and a switch in said circuit connected for actuation to operate said electrical means by said speed sensing means when said speed sensing means moves said valve in the speed decreasing direction as a function of a predetermined speed sensing force thereon above a predetermined opposing force of said speed establishing means.

References Cited in the file of this patent

UNITED STATES PATENTS

| | | |
|---|---|---|
| 2,157,472 | Bellis | May 9, 1939 |
| 2,248,780 | Pierce | July 8, 1941 |
| 2,450,199 | Leibing | Sept. 28, 1948 |
| 2,672,855 | Thomas | Mar. 23, 1954 |
| 2,836,159 | Morden | May 27, 1958 |
| 2,916,100 | Teetor | Dec. 8, 1959 |
| 2,966,224 | Teetor | Dec. 27, 1960 |
| 2,990,825 | Fuller et al. | July 4, 1961 |